United States Patent
Dotaro et al.

(10) Patent No.: US 7,386,233 B2
(45) Date of Patent: Jun. 10, 2008

(54) RING NETWORK MADE USING A DUAL OPTICAL DATA BUS

(75) Inventors: Emmanuel Dotaro, Verrieres le Buisson (FR); Nicolas Le Sauze, Bures-sur-Yvette (FR); An Ge, Plano, TX (US); Ljubisa Tancevski, Dallas, TX (US)

(73) Assignee: Alcatel, Paris (FR)

( * ) Notice: Subject to any disclaimer, the term of this patent is extended or adjusted under 35 U.S.C. 154(b) by 440 days.

(21) Appl. No.: 10/488,772

(22) PCT Filed: Sep. 6, 2002

(86) PCT No.: PCT/FR02/03032

§ 371 (c)(1),
(2), (4) Date: Mar. 5, 2004

(87) PCT Pub. No.: WO03/021823

PCT Pub. Date: Mar. 13, 2003

(65) Prior Publication Data

US 2004/0240881 A1 Dec. 2, 2004

(30) Foreign Application Priority Data

Sep. 6, 2001 (FR) .................................. 01 11534

(51) Int. Cl.
*H04B 10/24* (2006.01)
(52) U.S. Cl. ............................. 398/59; 398/4; 398/31
(58) Field of Classification Search ................ 398/3–4, 398/59, 31
See application file for complete search history.

(56) References Cited

U.S. PATENT DOCUMENTS

| 5,058,101 | A | 10/1991 | Albanese |
| 5,101,290 | A * | 3/1992 | Eng et al. ...................... 398/51 |
| 5,864,415 | A | 1/1999 | Little |
| 6,204,943 | B1 * | 3/2001 | Hamel et al. ................... 398/9 |
| 6,256,321 | B1 | 7/2001 | Kobayashi |
| 6,766,113 | B1 * | 7/2004 | Al-Salameh et al. .......... 398/30 |

FOREIGN PATENT DOCUMENTS

| EP | 1 128 585 A2 | 8/2001 |
| WO | WO 00/48347 | 8/2000 |
| WO | WO 00/72491 A2 | 11/2000 |

* cited by examiner

*Primary Examiner*—Leslie Pascal
(74) *Attorney, Agent, or Firm*—Sughrue Mion, PLLC

(57) ABSTRACT

The invention relates to an optical ring network comprising stations (340) which are connected to at least one optical fiber by means of optical couplers, the two ends of the optical fiber being connected to a point of presence or an optical network access node. The point of presence comprises (k) at least an optical emitter (330-1) which emits a falling optical signal having at lest one first wavelength (420) in the direction of one end of the optical fibers (455) and (ii) at least one optical receiver (330-2) which receives a rising optical signal having at least one second wavelength which is different form the first wavelength. The aforementioned optical network access node comprises means such as a hub (320) which can be used for the communication between the optical receiver (330-2) and the optical emitter (330-1). The wavelengths of the rising signals and the wavelengths of the falling signals are shared by several stations.

22 Claims, 4 Drawing Sheets

RING NETWORK MADE USING A DUAL OPTICAL DATA BUS

BACKGROUND OF THE INVENTION

The present invention relates generally to the technology of transmission via optical fibers and more particularly to a ring network using a dual optical data bus.

The ever-increasing use of public and private networks to transport data has for some years now given rise to an enormous demand for bandwidth, for exchanging ever-increasing quantities of information and setting up all forms of communication, from exchanging simple text and picture files to the considerable expansion of electronic mail (E-mail) and all types of business massaging, via voice transport, including conventional telephony using the time division multiplexing (TDM) mode and protocols, and even the transport of voice in packet mode using Voice over IP (VoIP) exchange protocols, video distribution and, of course, all the applications resulting from the considerable expansion of the Internet and especially its universally used main application, the World Wide Web (WWW).

To face up to this demand for bandwidth, those responsible for providing the networks soon had to have recourse to transporting the signals carrying the information in optical form, so as to benefit firmly from the low cost of the fibers themselves and secondly from the very high bit rates that can be achieved, despite transmission distances measured in kilometers, or even tens or hundreds of kilometers, without having to regenerate the signal, attenuation being very low, especially in mono mode fibers, compared to the attenuation resulting from electrical transmission over copper cables, for example. Moreover, optical transmission avoids all the problems that are associated with electromagnetic interference and which necessitate costly protection circuits and can lead to frequent transmission errors.

The first use of optical fibers was essentially in point-to-point connections. Thus, the transport signals are converted into light signals that are transmitted between two nodes of a network and are immediately converted back into electrical signals on reception, in order to be processed in the receiver node which, after analyzing the information received, must either relay the information to another node of the network or use the data locally. In the former case further electrical-to-optical conversion is needed, of course, even though the payload information transported has not been modified and only the final destination has had to be examined.

Figure 1:
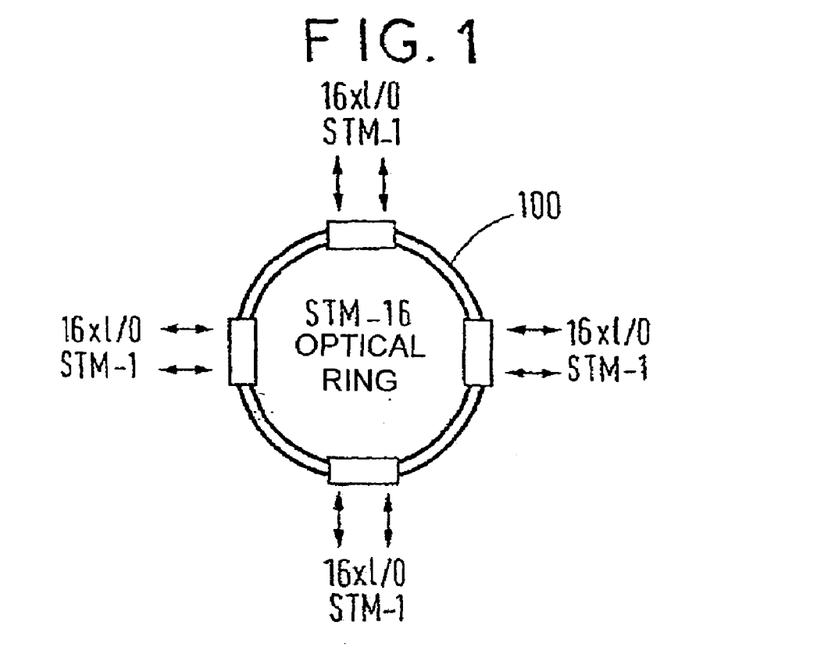
FIG. 1 depicts a prior art SONET or SDH type optical ring including add/drop multiplexers (ADM).

This mode of operation is used in Synchronous Optical NETwork (SONET) and Synchronous Digital Hierarchy (SDH) rings in particular, which are respectively the standard for North America and for Europe, and are for the most part compatible. In particular, the transmission bit rates are standardized, and the higher bit rates that are most widely used are 2.48 Gb/c (SONET OC-48 and SD STEM-16), 10 Gb/c (SONET OC-192 and SD STEM-64) and even 40 Gb/c (SONET OC-768 and SDH STM-256). It is to be noted that, as shown in FIG. 1, these rings in fact consist of a double ring of optical fibers 100, one of which is an inactive protection channel and is used only in the event of a break in the active fiber, after fast automatic protection switching (APS), taking less than 50 milliseconds, has taken place to assure the continuity of traffic that constitutes an essential quality criterion for networks of this kind transporting enormous quantities of data. The nodes of these networks are generally add/drop multiplexers (ADM) 110 which provide local access to a portion of the data stream without affecting the remainder of the traffic, although necessitating at each node optical-electrical-optical (O-E-O) conversion of the traffic. SONET/SDH rings have been very successful and are still very widely used, because of the APS system referred to above, and their inherent capability of adapting to the ever higher transmission speeds required by the extremely rapid expansion of the amounts of data exchanged characteristic of the last several years.

This first applications of optical fibers nevertheless soon proved to be insufficient. Although the fiber itself is of relatively low cost, its deployment can be very labor-intensive and prove extremely costly. Rather than deploy more optical fibers when the capacity of an installed network becomes insufficient, the solution has been adopted of making better use of the fibers already in place. By transmitting different frequencies in the same fiber, the wavelength division multiplexing (WDM) technique multiplies the number of completely independent transmission channels on the same physical fiber. In other words, transmitting light rays of different "colors" multiplies the bandwidth of a single fiber commensurately. The dense WDM (DWDM) technique, which soon succeeded the WDM technique, can multiplex 80 or even more channels.

Although the above techniques provided an effective response to the enormous demand for bandwidth, this led to the development of an optical data transport layer that itself gave rise to a few problems. The essential reason for this was that, in the current state of the art, the signals and the data transported are still processed essentially in the electrical domain. Accordingly, optical/electrical conversion is essential each time that the transported data has to be examined. In particular, in systems transporting information in packet mode, it is usually necessary to consult the packet headers at each network node to determine the next hop (i.e. the next destination node). This is the case with the Internet Protocol (IP) in particular, which is obviously in very widespread use, and which operates in the connectionless mode, in contrast to other protocols for which a path must be set up beforehand, by means of appropriate signaling, before the exchange of data can take place. This is the case with telephony and with the TDM modes of transport previously mentioned.

Thus although the optical transport of signals for exchanging data is intrinsically of relatively low cost, electrical/optical and optical/electrical conversion remain costly. In particular, light is almost always injected into an optical fiber from lasers, which have to be more sophisticated to mix numerous wavelengths in the same fiber (as in the DWDM technique). This is because the various "colors" or wavelengths used are much closer together, of course, and there is the risk that their emission spectra may overlap, making it impossible to distinguish them on reception unless the lasers used are capable of emitting in a very narrow frequency band, which makes them more difficult to produce and therefore more costly.

The document EP 1.128.585 describes a multilevel optical network. The lowest level comprises a ring and stations coupled to the ring by access nodes that do not necessitate optical/electrical or electrical/optical conversion. The ring comprises two optical fibers carrying uplink information and downlink information, respectively. Each node is connected to a plurality of stations by a star network. Each access network comprises:

two passive optical couplers connected to respective fibers,
a demultiplexer for downlink signals connected to a first coupler, and a multiplexer for uplink signals connected to the second coupler.

Each station is connected to the access node by a single fiber that is specific to it. Onto this fiber are multiplexed a wavelength carrying an uplink signal and a different wavelength carrying a downlink signal. Each station communicates with the remainder of the node by means of two wavelengths that are specific to the station.

SUMMARY OF EXEMPLARY EMBODIMENTS

In the above prior art network, passive optical couplers drop and/or add local traffic, thereby implementing a purely optical add/drop multiplex (ADM) function, using components of relatively low cost. On the other hand, the network requires two different wavelengths for each station, and thus a large number of wavelengths. The object of the invention is to propose an optical network making more efficient use of wavelength resources.

The invention therefore consists in a ring optical network comprising at least one optical fiber and at least two stations coupled to said optical fiber by optical couplers, both ends of said optical fiber being connected to an access node of said optical network, and said access node comprising:
- at least one optical sender for sending a downlink optical signal having at least a first wavelength toward one end of said fiber,
- at least one optical receiver at the other end of said fiber and receiving an uplink optical signal having at least one second wavelength different from said first wavelength, and
- means for providing communication between said optical receiver and said optical sender, said optical network being characterized in that it comprises medium access control means allowing a plurality of stations to share at least one uplink wavelength.

The network characterized by such medium access control means makes better use of wavelength resources because the medium access control means allow a plurality of stations to share the same wavelength for uplink signals. This is reflected in a reduced network cost for a given transmission capacity.

In a preferred embodiment, the medium access control means allow a plurality of stations to share at least one downlink wavelength.

In a preferred embodiment, the optical network further comprises call admission control means that comprise means for:
- receiving a bandwidth request message sent by a station and indicating a type of data to be added on an uplink wavelength,
- determining a parameter value defining a rate of addition of data to an uplink wavelength usable by the station that has sent a bandwidth request message, said value being determined as a function of the traffic present on the ring and the type of data to be added, and
- sending a control message containing said parameter value to said station.

The ring may comprise a single fiber carrying downlink signals and uplink signals, which preferably propagate in the same direction.

In another embodiment, a second fiber provides protection against faults of the first fiber. In other embodiments, the various wavelengths used may be divided between a plurality of fibers. In all cases, different uplink wavelengths are used in the same fiber and different downlink wavelengths are used in the same fiber.

BRIEF DESCRIPTION OF THE DRAWINGS

The above object of the invention and other objects, features and advantages of the invention will emerge more clearly from the following detailed description of a preferred embodiment of the invention given with reference to the accompanying drawings, in which.

DETAILED DESCRIPTION OF EXEMPLARY EMBODIMENTS

Figure 2:
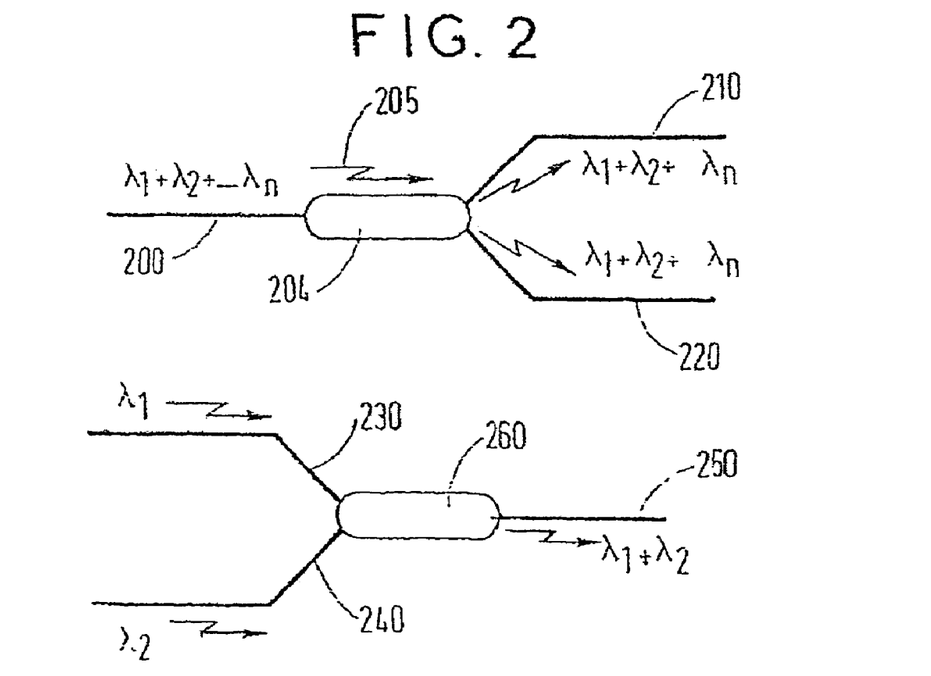
FIG. 2 depicts optical couplers that can be used to implement the invention.

FIG. 2 depicts optical couplers 204 and 260 that may be used to implement the invention, are of relatively low cost, and are available off the shelf in many different designs, with characteristics varying according to the application.

The coupler 204 directs to at least two optical fibers 210, 220 all the optical signals 205 with different wavelengths $\lambda_1$ to $\lambda_n$ received on a single fiber 200. Depending on the characteristics of the coupler, the optical signals can be split equally or one path can be favored to the detriment of the other, or the others if there are more than two. There are many applications of this type of device, for example diverting a small portion of the power of all the wavelengths $\lambda_1$ to $\lambda_n$ in a fiber in order to measure the characteristics thereof. In the frequent situation of 1-to-2 couplers, like the coupler 204, and where the energy of the incoming waves is split equally between the two branches, and thus divided by two, the nominal power penalty (attenuation) is therefore 3 dB, which is relatively low given that optical receivers are capable of operating over a wide range of attenuation, of at least 10 dB and often more. In this type of application, a coupler is often called a splitter, for obvious reasons. Thus in the general case a coupler of this type is a 1-to-N splitter.

The function of the coupler 260 is to combine the optical signals coming from two optical fibers 230, 240 onto a single optical fiber 250, i.e. the function that is the converse of that described above. As a general rule this is done to combine signals having different wavelengths, for example $\lambda_1$ and $\lambda_2$, so that the incoming waves do not interfere, thereby wavelength division multiplexing them onto the same transmission medium.

In practice, couplers are often obtained by fusing a plurality of optical fibers, three fibers in the FIG. 2 example.

Figure 3:
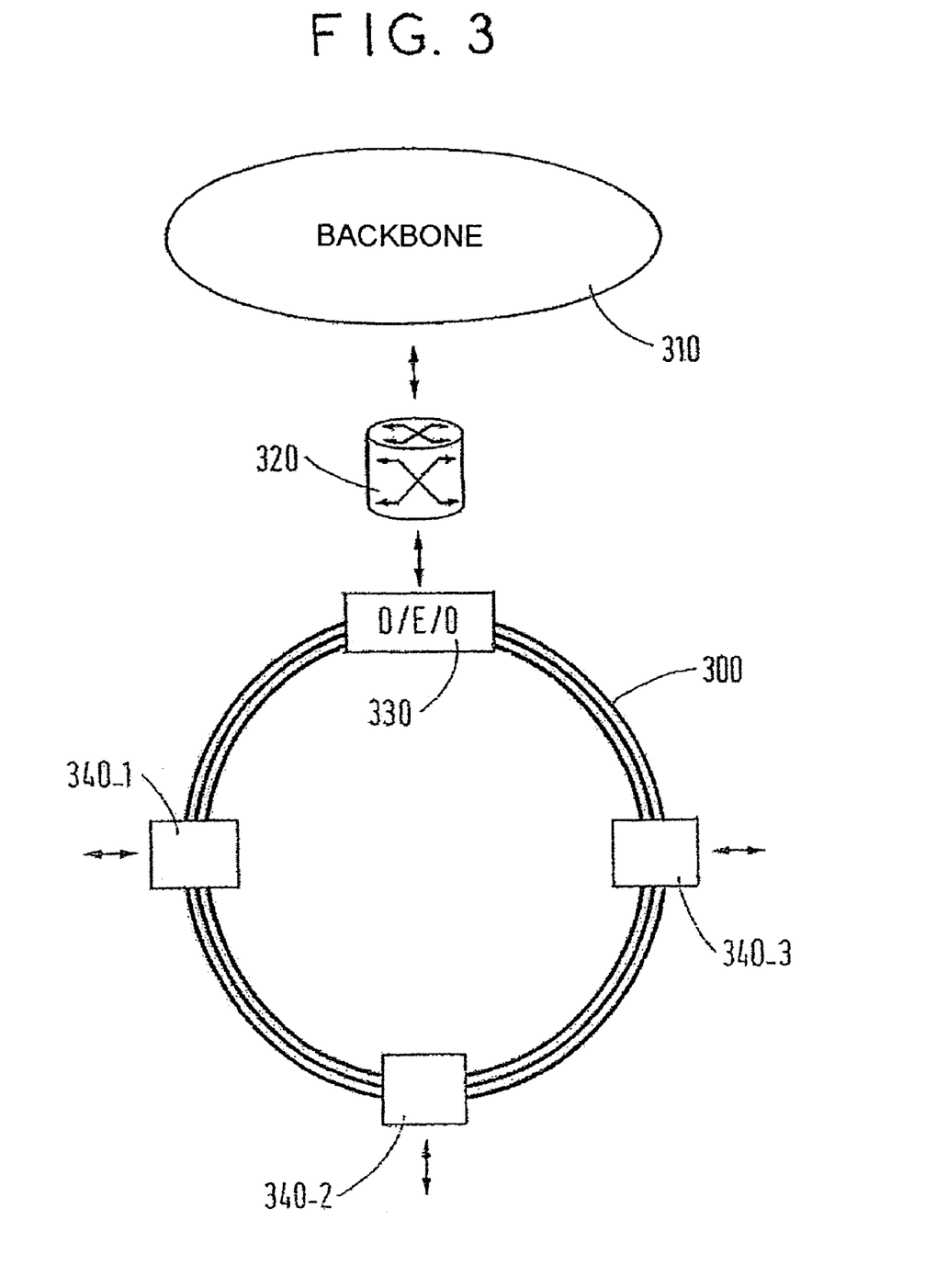
FIG. 3 depicts the general principle of a ring network according to the invention.

FIG. 3 is a general view of one example of a ring network of the invention. The ring 300 comprises at least one optical fiber, and preferably comprises two fibers in order to be able to assure continuity of service to users in the event of a malfunction of equipment connected to one fiber or in the event of a transmission break on the fiber itself. The ring itself is generally connected to at least one other backbone (federator network) 310 via an access node (point of presence (POP)) 320-330 comprising:

A concentrator (hub) 320 still operating essentially in the electrical domain, in particular because it must still be equipped with sufficient storage means, in the form of electronic memories, to be able to store traffic temporarily.

Optical-electrical-optical (O-E-O) converters 330 for intercepting all the traffic circulating on the ring 300.

The user stations 340-1, 340-2, 340-3 are connected to the optical ring by couplers of the type shown in FIG. 2. They are therefore able to divert and receive traffic addressed to them in the optical domain and also to inject their own traffic to other stations on the ring or to other networks via the access node:

either via the concentrator 320, if the receiving station is not equipped with receivers capable of detecting at least one uplink wavelength common to the two stations, or directly, if the station is equipped with such receivers.

The access node 320-330 comprises:

among the O-E-O devices 330, at least one optical sender for sending a downlink optical signal having at least a first wavelength toward one end of said fiber, among the O-E-O devices 330, at least one optical receiver at the other end of the fiber for receiving an uplink optical signal having at least a second wavelength different from said first wavelength, means enabling communication between said optical receiver and said optical sender, essentially consisting of the concentrator 320, and call admission control means allowing the stations 340 to set up connections between themselves or with stations off the ring, via the access node 320-330 and the backbone 310.

Figure 4:
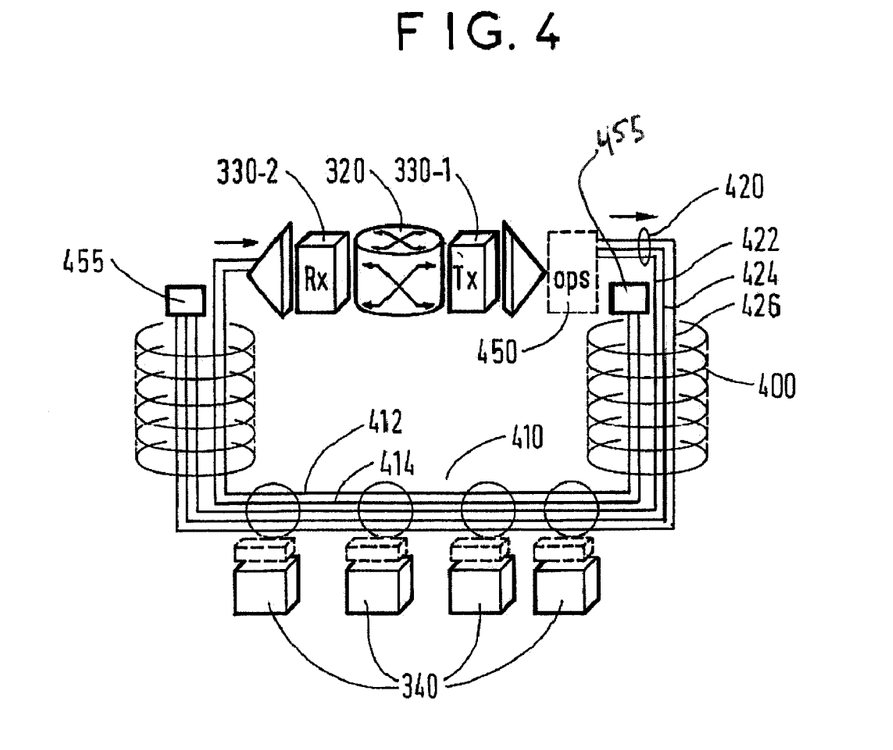
FIG. 4 depicts in more detail a network according to the invention.

FIG. 4 depicts in more detail the ring shown in FIG. 3. FIG. 4 shows all the different wavelengths 400 circulating on the fiber or fibers 463 forming the ring 300. There are five different wavelengths in this example:

Two wavelengths 412 and 414 are shored by the four stations 340 to carry uplink signals to the receiver portion 330-2 of the access network 320-330.

Three wavelengths 422, 424, 426 are shared by the four stations 340 to receive downlink signals sent to the stations by the sender portion 330-1 of the access node 320-330; the stations con therefore receive traffic that is specific to them, on one or more particular wavelengths, and also receive on one or more wavelengths shored between a plurality of stations.

Figure 5:
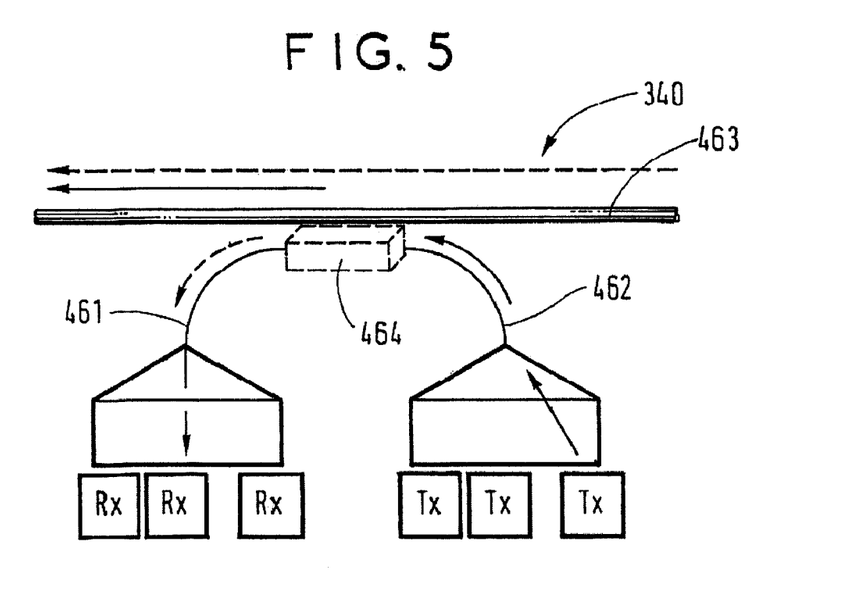
FIG. 5 is a block schematic of one embodiment of a station for the network of the invention.

FIG. 5 is a highly schematic depiction of one embodiment of one of the stations 340 depicted in FIG. 4. It is coupled optically to a fiber 463 by a coupler 464 which has four ports. The transmit devices Tx and receive devices Rx of this station are connected to the two ports 461 and 462, respectively. It will be noted that the stations must further include optical switching means in order to be able to switch to another optical fiber, or to other optical fibers, if protection in the event of a fault is required. It is to be noted that the stations 340 are themselves able to intercept the optical signals sent by the other stations, if necessary, even if the traffic between stations is preferably under the control of the control means of the concentrator 320, able to operate as a network master and to regulate all the traffic circulating on the network.

The wavelengths are shored by time division multiplexing. Of the packets time division multiplexed onto a wavelength, each station picks out those which are addressed to it. In particular, multicast (point-to-multipoint) traffic and broadcast traffic directed to a particular group of stations or to all stations can therefore be received by more than one station, and even by all the stations if necessary.

In one particular embodiment, the access node 320-330, which is the network master in a preferred embodiment of the invention, can use a wavelength common to all the stations to transmit network configuration commands, for example, or to implement a medium access control (MAC) layer (the various uplink wavelengths [?]) [sic]. Its role is to assign time slots on uplink wavelengths to stations that have traffic to send, so that two stations do not send on the some uplink wavelength at the same time, and to assign time slots on downlink wavelengths to stations that have traffic to receive via the access node, so that each station has equitable access to the downlink wavelength resources.

In different embodiments of the invention, the stations may employ:

one or more optical senders and/or receivers having fixed wavelengths, which wavelengths are different in the case of the senders;

one or more optical senders and/or receivers having wavelengths that can be varied slowly to change the wavelength sharing laws in the long term; and one or more optical senders and/or receivers having wavelengths that can be varied quickly between two sending/receiving operations or between two series of sending/receiving operations.

It will therefore have been noted that the invention organizes the transfer of data using two groups of wavelengths, one in the downlink direction of sending from the access nodes 320-330 to the stations 340, and consisting in this example of the group (optical bus) 420 of three wavelengths $\lambda_T$ 422, 424, 426, and the other in the uplink direction of sending from the stations to the access node 320-330, and here consisting of the group (optical bus) 410 of two wavelengths 412, 414. It may also be noted that these optical buses in no way prejudge the physical distribution of the wavelengths and that in particular the different wavelengths constituting a bus can circulate on different optical fibers if necessary, although with adequate termination at the end of the bus, for example the termination 455 depicted in FIG. 4, to avoid disturbing transmission.

Moreover, the invention does not presuppose that the uplink traffic and the downlink traffic are necessarily of the same magnitude. Depending on the application, the downlink traffic may be greater or even much greater than the uplink traffic, for example. This would be the case in a video distribution system.

At least one back-up fiber can optionally be used to assure continuity of traffic in the event of failure of certain components or functions. Optical switching means 450 switch between the active fiber and the back-up fiber to protect the traffic. Thus, in accordance with the invention, it is possible to switch the traffic from one optical fiber or from one group of optical fibers to another optical fiber or to another group of optical fibers in the optical domain, i.e. without having to implement costly protection means in the electrical domain, such as those developed for SONET (APS) networks, for example. Here passive devices such as those depicted in FIG. 2, or other such devices, such as simple electrically controlled optical switches, are deployed on the sending side of the access node in particular so that the optical traffic can be oriented differently if necessary.

To summarize, the system proposed by the invention may be used to organize a network around a dual optical bus (which can be carried by a single fiber), each of the two portions of the dual bus being able to convey one or more specific wavelengths for exchanging data between an access node and stations connected to the bus. The cost is low because it does not require all the traffic circulating on the ring to be converted into the electrical domain at each station. The stations are connected via simple passive optical devices known as couplers capable of diverting (dropping) a fraction of the energy of the wavelengths circulating on the ring or adding other wavelengths.

The observation by a station of a specific wavelength or a specific plurality of wavelengths on the downlink portion of the dual optical bus enables it to extract traffic addressed to it. The traffic generated at each station is inserted into the uplink portion of the bus, with one or more other specific wavelengths, completing the implementation of the add/drop function at each station connected to the network that is indispensable for exchanging data with other stations or with the network access node.

Figure 6:
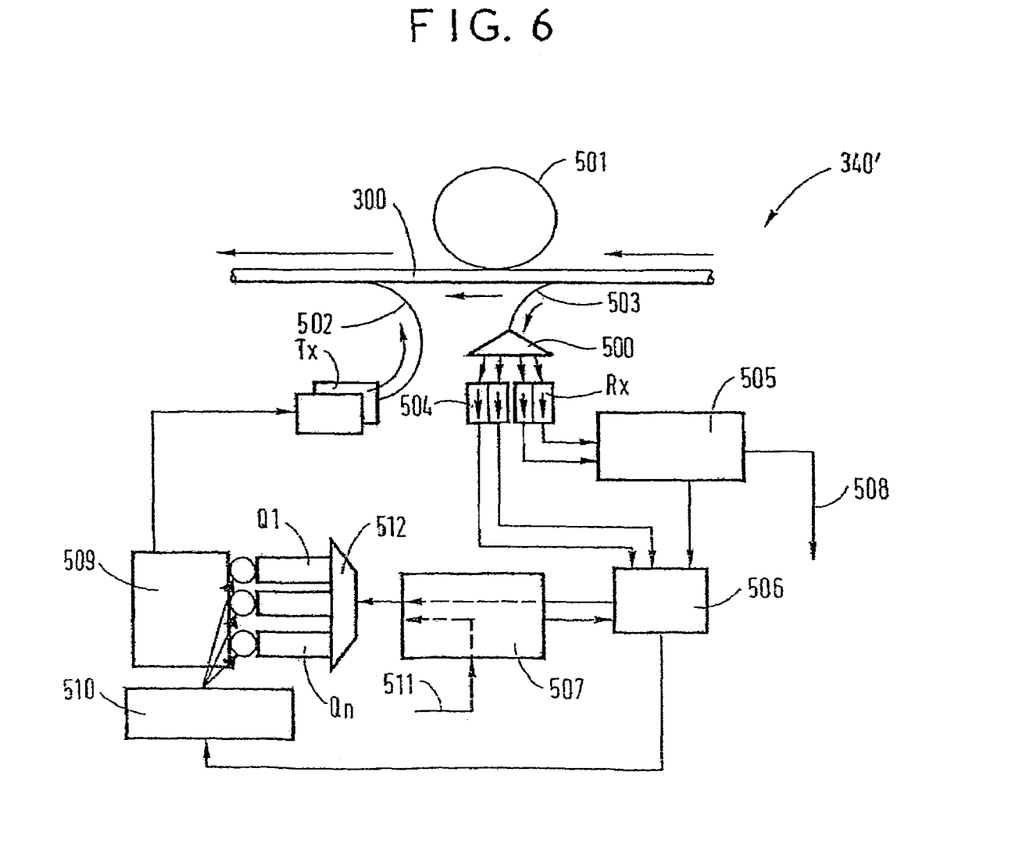
FIG. 6 is a block schematic of another embodiment of a station for the network of the invention.

FIG. 6 is the block schematic of another embodiment 340' of a station for the network of the invention. It comprises:
- an optical delay line 501 inserted into an optical fiber 300;
- a control unit 506 that implements a call admission control procedure in conjunction with the control means of the concentrator 320 of the access node and implements a medium access control procedure to assure collision-free sending;
- a coupler 503 on the upstream side of the delay line 501, for dropping a portion of the downlink signals on the fiber 300,
- a spectral demultiplexer 500 that splits the various wavelengths of the downlink signals dropped by the coupler 503,
- at least one optical receiver Rx connected to an output of the demultiplexer 500,
- at least one optical transmitter Tx connected to an input of the coupler 502 to send on an uplink wavelength,
- at least one photodiode 504 connected to an output of the demultiplexer 500, each photodiode 504 receiving on the respective wavelength of an optical transmitter Tx, being connected to the control unit 506, and measuring the optical power at an uplink wavelength for the medium access control procedure,
- a coupler 502 on the downstream side of the delay line 501, for adding uplink signals to the fiber 300,
- an electronic circuit 505 which recognizes and processes packets of data addressed to this station,
- a plurality of first-in-first-out queues Q1 to Qn each storing a respective type of data packet to be added to the ring, i.e. corresponding to a priority or a level of quality of service guaranteed by an agreement,
- an electronic circuit 507 having an input 511 receiving traffic to be added to the ring,
- a routing circuit 512 which writes data packets of the traffic to be added into the queues Q1 to Qn according to the respective priorities of the packets,
- an electronic circuit 510 for reading the queues Q1 to Qn at respective rates defined by commands from the control unit 506, and
- an electronic circuit 509 which adapts the format of the packets read in the queues Q1 to Qn before supplying them to the transmitters Tx.

The packets of data that arrive via the ring network and that pass through the station are not stored in electronic memories but merely delayed by the delay line 501 to make a processing time available. On the other hand, the data packets of the traffic to be added to the ring are stored in the queues Q1 to Qn until they can be sent over the ring.

The medium access control procedure is based on the photodiode(s) 504 and the control unit 506 detecting at least one wavelength available at a given time for sending uplink traffic. The call admission control procedure is further based on the control unit 506 detecting control packets for regulating the traffic added by each station. This traffic is regulated by the control means of the access point 320-330 to assure all the stations some degree of equitable access and to comply with the respective priorities of the different types of data. In the absence of such regulation, the stations receiving the downlink signals first would always be favored over the others, and low-priority packets would be added by those favored stations before high-priority packets from other stations.

The circuit 505 receives and splits packets containing management messages and payload data packets coming from the access node 320-330. The management messages are used to control the flow in the network and are transmitted to the control unit 506. The payload data packets are transmitted to an output 508. The information as to the presence of a sufficient gap on an uplink wavelength is sent to the corresponding transmitter Tx to start the sending of a new packet that has already passed the call admission control step. The device 509 includes a memory into which the next packet to be sent is loaded. The device 509 continuously advises the control unit 506 of the presence or absence of a packet ready to be sent.

The control unit 506 prepares management messages to send to the access node 330-320 and passes them to the circuit 507 for them to be converted into packet form and stored in whichever of the queues Q1 to Qn has the highest priority.

Each queue is emptied at a rate that is a function of a threshold value that is sent to the station by the control means in the access node 320-330. This rate is defined by the read control circuit 510 applying an algorithm that in particular compares the fullness of the queue to the threshold value to decide if it is time to extract a packet from the queue. This algorithm is analogous to the standard leaky bucket algorithm. If the control means in the access node 320-330 note a greater availability of a wavelength, they can lower the threshold value for a station utilizing that wavelength in order to accelerate the rate of extraction of packets from a queue.

When a station 340' requires to add data packets having a certain priority, it is authorized to do so only if the occupation of the network as seen from the location of that station allows this. The control unit 506 sends the control means in the access node 320-330 a packet containing a bandwidth request, indicating the type and quantity of data to be added to the uplink signal. The control means of the access point 320-330 respond with a packet containing a response message containing a threshold value for a certain wavelength (or even a plurality of wavelengths) and for a given priority (as indicated in the request message).

To determine a threshold value to be assigned to a station, the control means of the access point 320-330 determine the quantity of traffic present on the uplink wavelength that the station concerned is able to use and consult a table indicating a predetermined threshold value. Each threshold value has been determined beforehand by modeling, as a function of the quantity of traffic, the type of data, and the position of the station along the ring, for each of the uplink wavelengths.

The control means of the access point 320-330 likewise determine respective new threshold values for the other stations that were already adding packets. The new threshold values allow for the type of data packet being added and the quantities to be added, as indicated in the bandwidth requests sent previously by these stations. The threshold values are sent to the respective stations concerned in management messages. When the same station requests to add different types of packet, it receives a respective threshold value for each packet type.

When a station has no more traffic to add, it sends a signaling message to inform the control means of the access point 320-330 of this.

When a station has too much traffic to insert, i.e. when a queue reaches saturation, it sends a signaling message to advise the control means of the access point 320-330 of this. The latter means then apply a procedure consisting in reducing the rate of addition of packets by the other stations using the some wavelength as the station that is suffering congestion.

In a different embodiment, a 2-to-2 optical coupler can be used, as in FIG. 5. The delay line 501 must then be on the upstream side of the coupler. However, the photodiode 504 must remain on the upstream side of the delay line 501 to fulfill its function in the medium access control procedure. A 1-to-2 coupler is then placed on the upstream side of the delay line and connected to the photodiode 504.

The invention claimed is:

1. A ring optical network comprising:
   at least one optical fiber;
   an access node; and
   at least two stations coupled to said optical fiber by optical couplers, both ends of said optical fiber being connected to the access node of said optical network,
   wherein said access node comprises:
      at least one optical sender for sending a downlink optical signal having at least a first wavelength dedicated to signals transmitted in a downlink direction into one end of said fiber,
      at least one optical receiver at the other end of said fiber and receiving an uplink optical signal having at least one second wavelength dedicated to signals transmitted in an uplink direction different from said first, downlink wavelength, and
      means for providing communication between said optical receiver and said optical sender, and
   wherein said optical network further comprises medium access control means for allowing a plurality of stations to share at least one uplink wavelength for sending said uplink optical signal having said uplink wavelength in a collision-free manner to said optical receiver.

2. An optical network according to claim 1, wherein the medium access control means allow a plurality of stations to share at least one downlink wavelength.

3. An optical network according to claim 2, wherein a shared downlink wavelength is used for network management.

4. An optical network according to claim 1, wherein the medium access control means allows at least three stations to share same uplink wavelength to deliver data to the access node.

5. An optical network according to claim 1, wherein the medium access control means allows at least three stations to share same downlink wavelength to receive data from the access node.

6. An optical network according to claim 1, wherein the at least three stations provide data to the access node sharing same predetermined uplink wavelength for delivery of data to a federated network.

7. An optical network according to claim 1, wherein the medium access control means comprises a photodiode and a control unit positioned in at least one station for detecting that the shared uplink wavelength is available for the station to send uplink traffic.

8. A ring optical network comprising:
   at least one optical fiber;
   an access node; and
   at least two stations coupled to said optical fiber by optical couplers, both ends of said optical fiber being connected to the access node of said optical network,
   wherein said access node comprises:
      at least one optical sender for sending a downlink optical signal having at least a first, downlink wavelength into one end of said fiber,
      at least one optical receiver at the other end of said fiber and receiving an uplink optical signal having at least one second, uplink wavelength different from said first, downlink wavelength, and
      means for providing communication between said optical receiver and said optical sender,
   wherein said optical network further comprises medium access control means for allowing a plurality of stations to share at least one uplink wavelength for sending said uplink optical signal having said uplink wavelength in a collision-free manner to said optical receiver, and
   wherein the medium access control means further comprises call admission control means in the access node, said call admission control means comprising:
      means for receiving a bandwidth request message sent by a station and indicating a type of data to be added on an uplink wavelength,
      means for determining a parameter value defining a rate of addition of data to an uplink wavelength usable by the station that has sent a bandwidth request message, said value being determined as a function of the traffic present on the ring and the type of data to be added, and
      means for sending a control message containing said parameter value to said station.

9. An optical network according to claim 1, wherein optical senders and/or receivers of the stations comprise means for adjusting the wavelengths used.

10. An optical network according to claim 1, further comprises at least one active optical fiber and one back-up optical fiber.

11. An optical network according to claim 10, further comprises optical means for switching between said active fiber and said back-up fiber to protect traffic.

12. An optical network according to claim 11, wherein the stations are coupled to said active fiber and to said back-up fiber.

13. A ring optical network comprising:
   at least one optical fiber;
   an access node; and
   at least two stations coupled to said optical fiber by optical couplers, both ends of said optical fiber being connected to the access node of said optical network,
   wherein said access node comprises:
      at least one optical sender for sending a downlink optical signal having at least a first, downlink wavelength into one end of said fiber,
      at least one optical receiver at the other end of said fiber and receiving an uplink optical signal having at least one second, uplink wavelength different from said first, downlink wavelength, and
      means for providing communication between said optical receiver and said optical sender, wherein said optical network further comprises medium access control means for allowing a plurality of stations to share at least one uplink wavelength for sending said uplink optical signal having said uplink wavelength in a collision-free manner to said optical receiver, and wherein the medium access control is positioned in the access node and wherein the medium access control allocates time slots to the plurality of stations and wherein each of the plurality of stations transmit data to the access node in a respective allocated time slot in same wavelength.

14. An optical network according to claim 13, wherein the plurality of stations do not have an optical-electrical-optical converter and wherein only the access node has the optical-electrical-optical converter.

15. A ring optical network comprising:
an access node;
at least two stations;
at least one optical fiber connected in a downlink direction with respect to the access node and providing data to the two stations from the access node; and
at least one optical fiber connected in an uplink direction with respect to the access node and providing data from the two stations to the access node,
wherein the downlink optical fiber and the uplink optical fiber form a ring configuration,
wherein said access node comprises:
at least one optical sender for sending a downlink optical signal having a first predetermined wavelength on the downlink optical fiber to the two stations,
at least one optical receiver receiving an uplink optical signal having a second predetermined wavelength different from said first predetermined wavelength, and
a unit which provides communication between said optical receiver and said optical sender of the access node, and
further comprising medium access control means for allowing the two stations to share the second predetermined wavelength in the uplink direction to transmit the data to the access node in a collision-free manner, wherein the second predetermined wavelength is dedicated to transmitting signals in the uplink direction.

16. The ring optical network according to claim 15, wherein the access node transmits the data to the two stations at the first predetermined wavelength in the downlink direction.

17. The ring optical network according to claim 15, wherein the medium access control means comprises a photodiode and a control unit positioned in each of the two stations for detecting that the second predetermined wavelength is available for the station to send uplink traffic.

18. The ring optical network according to claim 17, wherein the control unit detects the presence of a sufficient gap on the second predetermined wavelength for the station to send an optical packet.

19. A ring optical network comprising:
an access node;
at least two stations;
at least one optical fiber connected in a downlink direction with respect to the access node and providing data to the two stations from the access node; and
at least one optical fiber connected in an uplink direction with respect to the access node and providing data from the two stations to the access node, wherein the downlink optical fiber and the uplink optical fiber form a ring configuration,
wherein said access node comprises:
at least one optical sender for sending a downlink optical signal having a first predetermined wavelength on the downlink optical fiber to the two stations,
at least one optical receiver receiving an uplink optical signal having a second predetermined wavelength different from said first predetermined wavelength, and
a unit which provides communication between said optical receiver and said optical sender of the access node, and
further comprising medium access control means for allowing the two stations to share the second predetermined wavelength in the uplink direction to transmit the data to the access node in a collision-free manner, and
further comprising a first termination end positioned after the two stations in the downlink direction, which terminates the transmission of the data on the downlink fiber and a second termination end positioned before the two stations in the downlink direction, which staffs the fiber in the uplink direction.

20. A ring optical network comprising:
an access node;
at least two stations;
at least one optical fiber connected in a downlink direction with respect to the access node and providing data to the two stations from the access node; and
at least one optical fiber connected in an uplink direction with respect to the access node and providing data from the two stations to the access node,
wherein the downlink optical fiber and the uplink optical fiber form a ring configuration,
wherein said access node comprises:
at least one optical sender for sending a downlink optical signal having a first predetermined wavelength on the downlink optical fiber to the two stations,
at least one optical receiver receiving an uplink optical signal having a second predetermined wavelength different from said first predetermined wavelength, and
a unit which provides communication between said optical receiver and said optical sender of the access node, and
further comprising medium access control means for allowing the two stations to share the second predetermined wavelength in the uplink direction to transmit the data to the access node in a collision-free manner,
wherein the unit which provides communication between said optical receiver and said optical sender of the access node is a concentrator that operates in an electrical domain and comprises a memory for temporarily storing data, and
wherein said optical receiver and said optical sender of the access node comprise an optical-electrical converter and an electrical-optical converter, respectively.

21. An optical network according to claim 7, wherein the control unit detects the presence of a sufficient gap on the shared uplink wavelength for the station to send an optical packet.

22. A ring optical network comprising:
an access node;
at least two stations;

at least one optical fiber connected in a downlink direction with respect to the access node and providing data to the two stations from the access node; and at least one optical fiber connected in an uplink direction with respect to the access node and providing data from the two stations to the access node, wherein the downlink optical fiber and the uplink optical fiber form a ring configuration, wherein said access node comprises:

at least one optical sender for sending a downlink optical signal having a first predetermined wavelength on the downlink optical fiber to the two stations,     at least one optical receiver receiving an uplink optical signal having a second predetermined wavelength different from said first predetermined wavelength, and     a unit which provides communication between said optical receiver and said optical sender of the access node, and further comprising medium access control means for allowing the two stations to share the second predetermined wavelength in the uplink direction to transmit the data to the access node in a collision-free manner, and wherein the medium access control means comprises a control unit positioned in the access node for allocating time slots to the two stations and wherein each of the two stations transmit data to the access node in a respective allocated time slot on the second predetermined wavelength.

\* \* \* \* \*